US012410767B1

(12) United States Patent
Jiang

(10) Patent No.: US 12,410,767 B1
(45) Date of Patent: Sep. 9, 2025

(54) KELP WAVE ENERGY COLLECTOR APPARATUS AND SYSTEM

(71) Applicant: The United States of America, as represented by the Secretary of the Navy, Arlington, VA (US)

(72) Inventor: Thomas L. Jiang, McLean, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/916,880

(22) Filed: Oct. 16, 2024

Related U.S. Application Data

(60) Provisional application No. 63/558,149, filed on Feb. 27, 2024.

(51) Int. Cl.
*F03B 13/22* (2006.01)
*A01G 33/00* (2006.01)

(52) U.S. Cl.
CPC .............. *F03B 13/22* (2013.01); *A01G 33/00* (2013.01)

(58) Field of Classification Search
CPC ................................ F03B 13/22; A01G 33/00
See application file for complete search history.

(56) References Cited

U.S. PATENT DOCUMENTS

| | | | | |
|---|---|---|---|---|
| 4,950,104 A | * | 8/1990 | Streichenberger | ..... A01K 61/54 405/24 |
| 7,587,991 B2 | | 9/2009 | Buck | |
| 10,190,568 B2 | | 1/2019 | Gregory | |

(Continued)

FOREIGN PATENT DOCUMENTS

| CN | 103120138 B | 1/2015 |
|---|---|---|
| CN | 106614203 B | 8/2022 |

(Continued)

OTHER PUBLICATIONS

Bernitsas, Michael M, Kamaldev Raghavan, Y Ben-Simon, and E. M. H Garcia. 2008. "VIVACE (vortex induced vibration aquatic clean energy): a new concept in generation of clearn and renewable energy for fluid flow." Journal of Offshore Mechanics and Arctic Engineering vol. 130.

(Continued)

*Primary Examiner* — Viet P Nguyen
(74) *Attorney, Agent, or Firm* — Jesus J. Hernandez; U.S. Department of the Navy, Office of the General Counsel

(57) ABSTRACT

Example embodiments provide a wave energy collector apparatus and system. According to an example embodiment, a wave energy collector apparatus may comprise a plurality of energy collection units, a support structure, and an anchoring element. The plurality of energy collection units may be configured to capture kinetic energy from water movement through use of organic material grown on the plurality of the energy collection units. The support structure may be configured to have buoyancy, the support structure comprising a shaped support and the plurality of energy collection units, wherein the plurality of energy collection units are distributed throughout the shaped support. The anchoring element may be connected to the support structure. The plurality of energy collection units may be configured to convert the captured kinetic energy into electricity.

19 Claims, 10 Drawing Sheets

(56) References Cited

U.S. PATENT DOCUMENTS

| | | | |
|---|---|---|---|
| 10,932,452 B2 | 3/2021 | Leslie | |
| 10,988,211 B2 | 4/2021 | Moffat | |
| 2017/0198401 A1* | 7/2017 | Phillips | H02K 35/02 |
| 2021/0244005 A1 | 8/2021 | Sinclair | |
| 2023/0010245 A1* | 1/2023 | McCall | F03B 13/10 |

FOREIGN PATENT DOCUMENTS

| | | | |
|---|---|---|---|
| EP | 3278662 B1 | 5/2019 | |
| KR | 101346505 B1 | 12/2013 | |

OTHER PUBLICATIONS

St-Gelais, Adam T., David W. Fredriksson, Tobias Dewhurst, Zachary S. Miller-Hope, Barry Antonio Costa-Pierce, and Kathryn Johndrow. 2022. "Engineering A Low-Cost Kelp Aquaculture System for Community-Scale Seaweed Farming at Nearshore Exposed Sites via User-Focused Design Process." Frontiers in Sustainable Food Systems 6.

L.E. Myers, A.S. Bahaj, C. Retzler, D. Pizer, F. Gardner, C. Bittencourt, J. Flinn, "Equitable Testing and Evaluation of Marine Energy Extraction Devices in terms of Performance, Cost and Environmental Impact (EQUIMAR)", Commission of the European Communities, Grant agreement No. 213380, Deliverable D5.2, Device classification template.

Feldman, David, Krysta Dummit, Jarett Zuboy, and Robert Margolis. 2023. "Spring 2023 Solar Industry Update." National Renewable Energy Laboratory. https://www.nrel.gov/docs/fy23osti/86215.pdf.

Hall, Danielle. 2022. "Currents Waves and Tides." Smithsonian. Accessed Jul. 2023. https://ocean.si.edu/planet-ocean/tides-currents/currents-waves-and-tides.

Polinder, Henk, and M. Scuotto. 2005 "Wave energy converters and their impact on power systems," International Conference on Future Power Systems, Amsterdam, Netherlands.

Ning Wanga, Jingdian Zoua, Yixuan Yanga, Xiayu Lia, Yilin Guoa, Chao Jianga,. 2019. "Kelp-inspired biomimetic triboelectric nanogenerator boosts wave energy harvesting." Nano Energy 541-547.

* cited by examiner

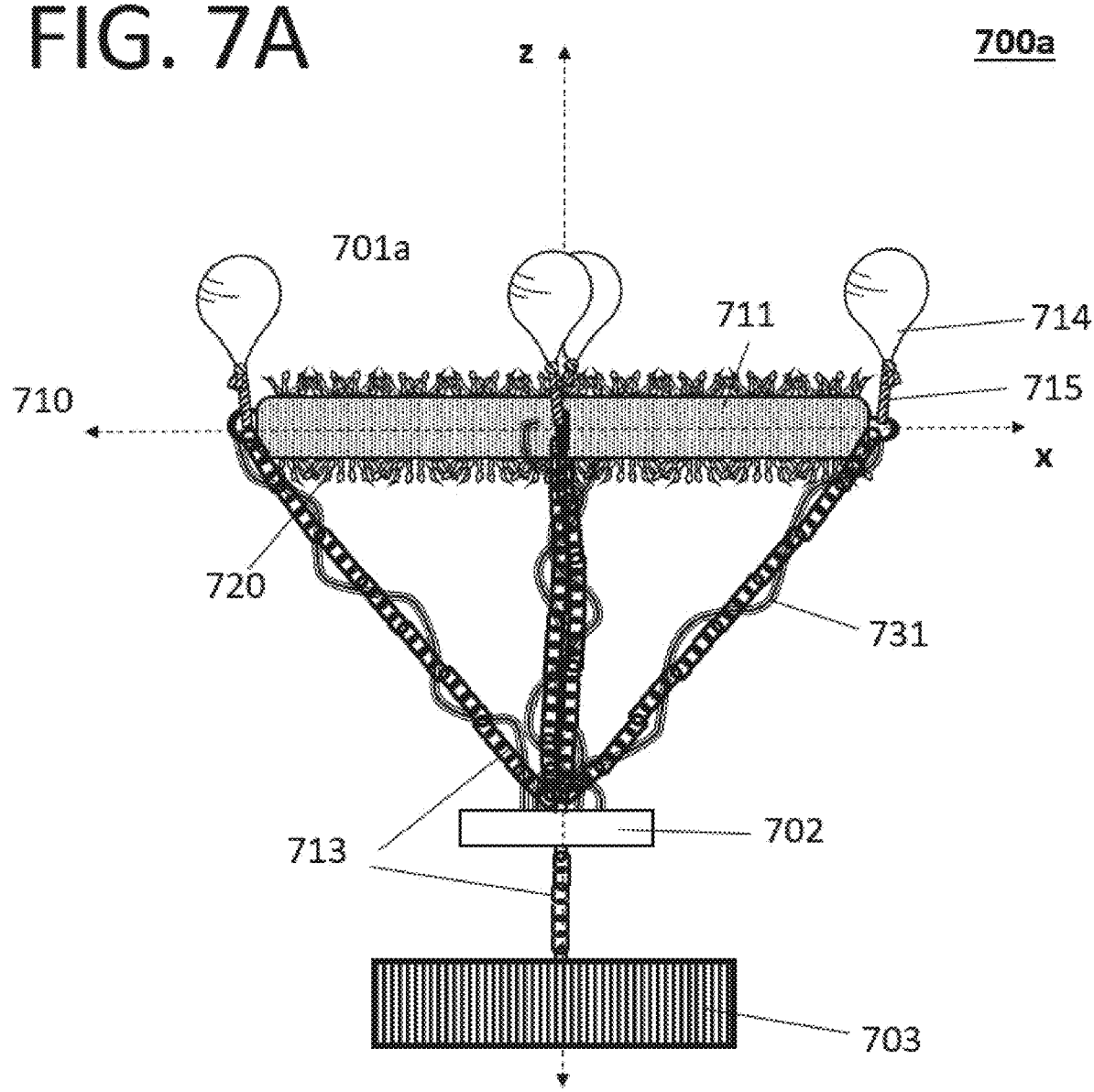

FIG. 8
800
810a
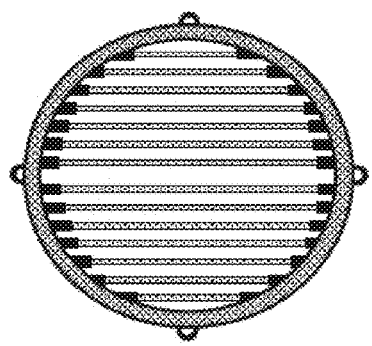
810b
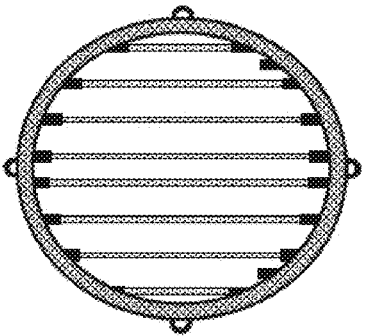
810c
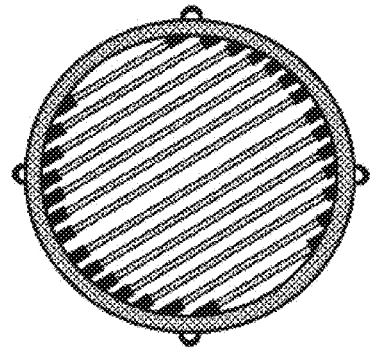
810d
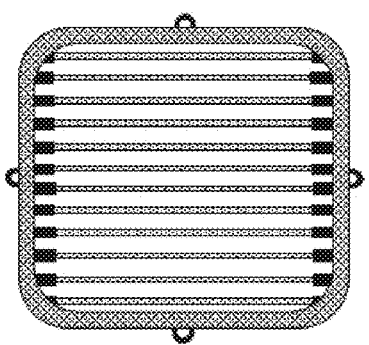
810e
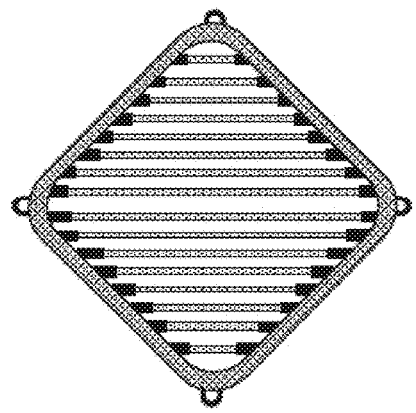

KELP WAVE ENERGY COLLECTOR APPARATUS AND SYSTEM

CROSS-REFERENCE TO RELATED APPLICATIONS

This application claims the priority to U.S. Provisional Patent Application No. 63/558,149 filed Feb. 27, 2024, titled "DESIGN OF A SELF-SUSTAINABLE AFFORDABLE MASS-SCALE OPENWATER ENERGY HARVESTER CAPABILITY FOR NAVAL OPERATIONS," incorporated herein by reference.

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to wave energy collectors.

BACKGROUND

Conventional wave energy collectors may collect kinetic energy from waves. Such wave energy collectors may be classified into four types: oscillating water column devices, hinged contour devices, buoyant moored devices, and overtopping devices.

Oscillating water column devices may use water movement to push and pull trapped air internal to the energy collector. This movement of air may be used to spin turbines and generate electrical energy.

Hinged contour devices, on the other hand, may rely on physical movement of different parts of a physical system, usually partially exposed to the water surface. The force generated from physical movement may then be translated into electrical power.

Buoyant moored devices are similar to hinged contour devices in translating physical system body movement into electrical power. Buoyant moored devices may be anchored to the seabed. This type of device may generate force of motion by system sink and float that is tied to a change in potential energy.

Finally, overtopping devices are designed with a water reservoir which is constantly changing in volume. Water may spill into the reservoir then flow downward to drive a turbine.

These conventional approaches present various disadvantages. The biggest disadvantage from conventional wave energy collectors is location. With conventional approaches, mainly power plants and cities near the ocean benefit. Also, conventional approaches are oftentimes dangerous to local fauna and/or flora. Associated machinery may alter the seabed, change habitats near a coast, and generate noise pollution. There is also risk of toxic chemicals spills.

Conventional approaches may also adversely impact human activity due to their proximity to populated areas. For instance, conventional approaches may disturb commercial and private vessels. Power plants that harvest wave energy are typically located along coasts in order to optimize performance and quickly provide electricity to populated areas. Conventional wave energy collectors may be unsightly for come populations living near the coast.

Conventional wave energy collectors are not cost efficient. Foremost is the expense of parts. Also, conventional approaches have a short lifespan and require frequent maintenance. The cost associated with conventional approaches is further increased in view of the unpredictable nature of ocean waves. Energy from ocean waves may depend on the length of a wave, wave speed, and the density of water. These elements may be variable and may make it difficult to ascertain a quantity of energy available.

SUMMARY

Example embodiments provide a wave energy collector apparatus and system. According to an example embodiment, a wave energy collector apparatus may comprise a plurality of energy collection units, a support structure, and an anchoring element. The plurality of energy collection units may be configured to capture kinetic energy from water movement through use of organic material grown on the plurality of the energy collection units. The support structure may be configured to have buoyancy, the support structure comprising a shaped support and the plurality of energy collection units, wherein the plurality of energy collection units are distributed throughout the shaped support. The anchoring element may be connected to the support structure. The plurality of energy collection units may be configured to convert the captured kinetic energy into electricity.

Other features and advantages of the example embodiments will become apparent to those skilled in the art upon examination of the following or upon learning by practice of the example embodiments.

BRIEF DESCRIPTION OF DRAWINGS

The accompanying figures are included to provide a further understanding of example embodiments, and are incorporated in and constitute part of this specification. In the figures:

FIG. 7A is a side view illustration of a kelp wave energy collector, according to example embodiments.

FIG. 8 is an illustration of alternative embodiments of a support structure of a kelp wave energy collector, according to example embodiments.

Figure 1:
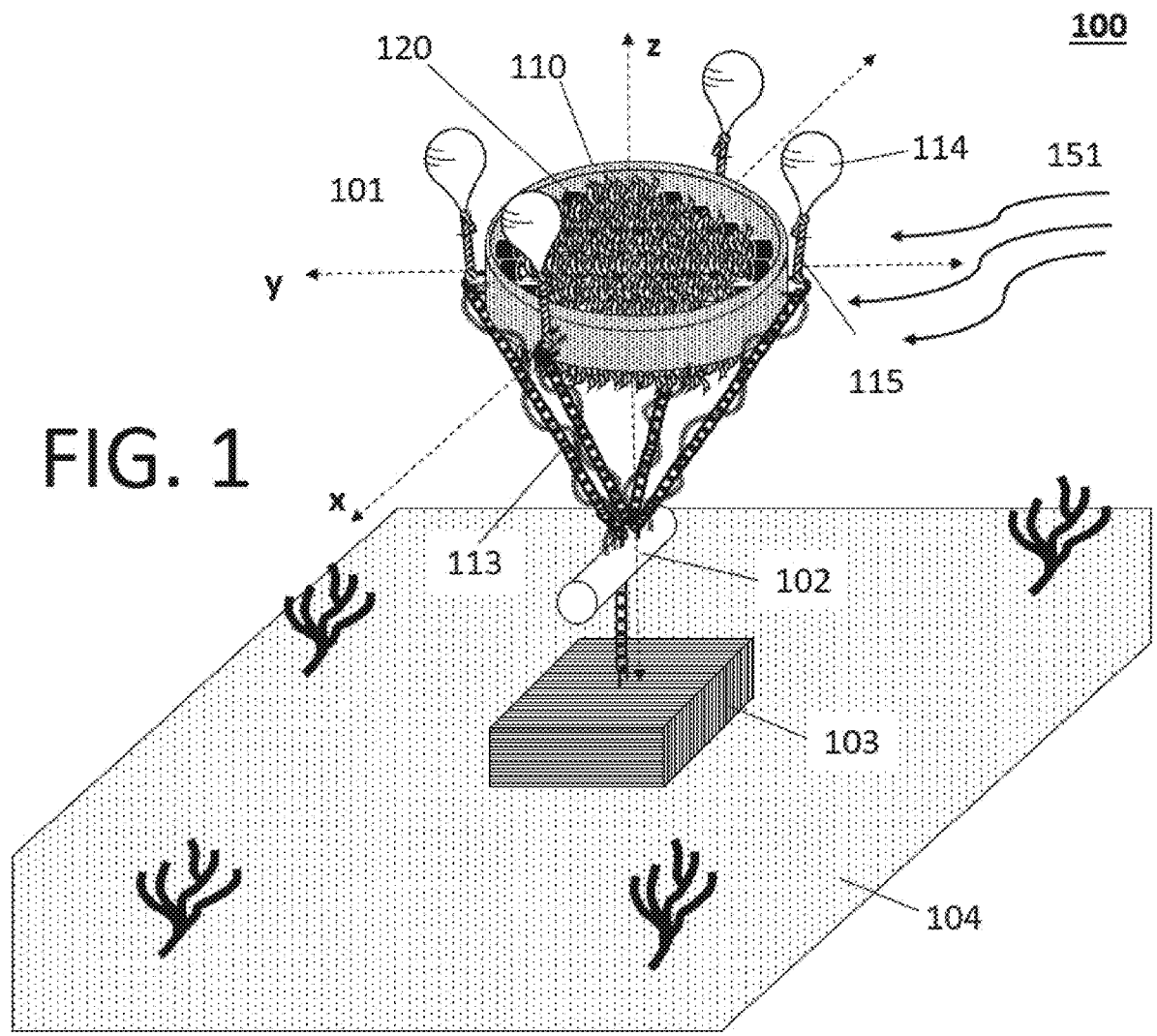
FIG. 1 is an illustration of a kelp wave energy collector, according to example embodiments.

In the figures, the leading number of each element corresponds to the figure number in order to facilitate better exposition when discussing a feature in a particular example embodiment. Common features across different figures use the same subsequent digits to maintain consistency.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a kelp wave energy collector apparatus and method of capturing wave energy with kelp. However, it should be noted that example embodiments shown and described herein are meant to be illustrative only and not limiting in any way. As such, various modifications will be apparent to those skilled in the art for application to other fields based on technologies other than the above, which may be in various stages of development and intended for future replacement of, or use with, the above described method or apparatus.

The goal of example embodiments is to use bioorganic matter in the form of kelp as an energy harvesting blade for the purpose of converting wave energy into electrical energy. Conventional approaches do not appear to leverage flora for the purpose of energy collection.

Waves may be formed by winds blowing over an ocean surface. Stimulant ocean wind may be formed by acceleration of air over the surface of water caused by temperature differential from solar heating. This phenomenon of energy transfer from solar/thermal to kinetic wave energy may result in a circular water motion with velocity and direction. A wave with velocity and direction may be defined as a propagating wave.

Propagating waves may carry different levels of kinetic energy. Kinetic energy may be calculated with linear wave theory. Such theory requires measuring wave frequency, wave period, and wave height. The wave frequency, period, and height may be directly influenced by wind speed, wind duration, and resulting interaction between the body of water and seabed.

Ocean water motion may be differentiated between surface waves and tides. Surface waves may be caused by wind transferring energy to the water. Big waves, or swells, can travel over long distances. Tides, on the other hand, may be a movement of the entire body of water, caused by gravitational pull of the moon and the sun on Earth. Wave energy collectors are designed to collect the kinetic energy of the wave, while other ocean energy collectors collect potential energy of a cycling tide.

Example embodiments describe a kelp ocean farm energy (KOFE) wave energy collector-hereinafter a "wave energy collector." The wave energy collector may provide reliable access to energy similar to the conventional approaches described above. Example embodiments provide a novel approach to capturing energy through the combined use of wave energy and kelp farming. The wave energy collector may use digital systems engineering methods to accomplish these ends. An objective of the example embodiments may be to provide energy in support of long term operations of vessels and/or other maritime crafts while also reducing life cycle costs and overall carbon footprint. The other maritime crafts may include unmanned underwater vehicles, gliders, sensors, and diver systems. Maritime crafts may also include aircraft, ocean platforms, docks, deep-water structures, and/or shipyards.

The novel architecture of the wave energy collector, according to example embodiments, leverages biological advantages of naturally regenerating kelp resources. Kelp resources may act as a major energy collector subsystem to deliver locally harvested energy.

In some example embodiments, the wave energy collector may use commercial-off-the-shelf (COTS) devices alongside other hybrid energy storage systems to reduce life cycle costs. COTS may be obtained from common distributors and/or specialized distributors. This approach may also streamline system integration. The wave energy collector operates based on linear wave theory. Example embodiments described hereinafter are premised on calculations from such theory.

The wave energy collector, according to example embodiments, may harness energy using a kelp ocean farming configuration. The wave energy collector may dispense with conventional approaches using of synthetic blades to capture kinetic energy generated by waves. Instead, example embodiments may use specialized fertilized kelp seeded pods to grow a bioorganic wave harvester. More particularly, organic blades of the kelp may become a kinetic energy capturing mechanism. This approach may simplify installation and maintenance costs. This approach may also be more eco-friendly by being made of flora that is endemic to the marine environment.

Example embodiments may use specialized fertilized kelp seeded pods. The particular type of kelp used may be based on anticipated costs, as well as availability in a targeted deployment location. Costs may be location specific, as selected kelp may be endemic to the marine environment in which the wave energy collector is used.

Given the nature of the wave energy collector, additional cost savings may be achieved in collaboration with local existing kelp farms. More specifically, the wave energy collector may produce excess kelp production over a growth cycle (e.g., 6-12 months). The excess kelp may generate a profit for kelp farms. In this manner, the wave energy collected may be both a source of revenue for kelp farming, as well as a source of energy collection. In such a scenario, the wave energy collector may be able to recuperate installation and/or maintenance costs over its lifecycle.

FIG. 1 is an illustration 100 of a kelp wave energy collector, according to example embodiments. The illustration 100 depicts a wave energy collector 101 situated on an ocean floor 104. The wave energy collector 101 may include an anchoring element 103 that fixes the entire apparatus to the ocean floor 104. The anchoring element 103 may prevent the wave energy collector 101 from being pushed away in any particular direction by an ocean wave 151. In alternative embodiments, the anchoring element may partially fix the wave energy collector 101 into place, allowing some, minimal, movement.

Floating above the ocean floor 104 may be a support structure 110. The support structure 110 may house a plurality of energy collection units 120. The support structure 110 may be kept buoyant by a plurality of buoyancy floater units 114. The illustration 100 depicts four buoyancy floater units 114. The buoyancy floater units 114 may be connected to the support structure 110 by floater unit support lines 115. Mooring lines 113 may connect the support structure 110 to the anchoring element 103.

The wave energy collector 101 may include an energy storage unit 102. The energy storage unit 102 may be connected to the mooring lines 113, between the support structure 110 and the anchoring element 103. The energy storage unit 102 may be electrically connected to the plurality of energy collection unit 120. In this manner, the energy storage unit 102 may receive the generated electricity from the plurality of energy collection unit 120. The electrical connection may be in the form of power lines that may either be part of, or adjacent to, the mooring lines 113. In some example embodiments, the energy storage unit 102 may also power the wave energy collector 101. The energy storage unit 102 may be removable.

The plurality of energy collection units 120 may comprise a kinetic energy capture sub-system and a power-take-off sub-system. More specifically, each individual energy collection units 120 may comprise a kelp farm line and a power-take-off (PTO) component. The kelp farm lines may be the kinetic energy capture sub-system. The PTO components may be the power-take-off system.

A single kelp farm line may hold a plurality of kelp plants, wherein the roots (holdfast) are within the kelp farm line. The blades of the kelp may extend out from the kelp farm line in order to capture kinetic force from the ocean wave 151. Collectively, the kelp—acting as the kinetic energy capture sub-system—may transfer the captured energy to the power-take-off sub-system. A further discussion of the sub-systems is provided with respect to FIG. 9.

The wave energy collector 101 may employ a referencing configuration to collect energy. In a referencing configuration, kinetic energy may be extrapolated from a wave when an appropriate damping force is applied by a component of the energy collection unit 120 in contact with, and providing resistance to, the wave 151. This component may be a primary conversion component. The kelp blades of the energy collection units 120 act as the primary conversion component. The primary conversion component is referenced to the ocean floor 104. In alternative embodiments, the primary conversion component may be referenced to a seabed, shoreline, or to another component which will not move along with the primary conversion component.

Wave energy collectors may be characterized by their referencing configuration. Referencing configurations distinguish between buoyancy and inertia components. The individual kelp farm line housed of each energy collection unit 120 may be characterized as a buoyancy-buoyancy self-referencing wave energy collection configuration. In this configuration, constituent components of the energy collection unit 120 may react to each other when located in different parts of a received ocean wave 151. In some example embodiments, the wave energy collector 101 may be roughly the same length, and in the same direction of propagation, as ocean wave 151. The buoyancy-buoyancy self-referencing wave energy collection configuration employed by the energy collection unit 120 may provide various advantages over other configurations in terms of volume to power absorption ratio. In addition, a buoyancy-buoyancy self-referencing wave energy collection configuration may provide increased survivability in a large storm wave, provided that the anchoring element 103 and mooring lines 113 provide adequate mooring under extreme maritime conditions.

The configuration of the buoyancy floater units 114 may be different from that provided in the illustration 100. For example, in alternative embodiments, there may be more or less than four buoyancy floater units 114. This may include, for example, one, two, three, fix, six, seven, eight, nine, ten, twelve, or more buoyancy floater units 114. In addition, the buoyancy of the buoyancy floater units 114 may be adjusted based on various factors, such as: the total size of the plurality of energy collection units 120; the type of kelp; the length of the kelp, the size and/or weight of the support structure 110; and the type of material of the support structure 110. It should be noted that kelp may also organically include $CO_2$ floaters. The $CO_2$ floaters may keep kelp in a fixed column in the marine environment. This natural feature of the kelp may complement the operation of the buoyancy floater units 114.

The wave energy collector 101 may provide locally sustainable power for increased capabilities in a marine environment. Deployment of the wave energy collector 101 around major coastlines may provide sustainable local logistical energy. This access to energy may be especially pronounced in marine environments with warm waters which may be optimized for increased kelp growth rate. An example of such an environment may be Pacific Rim islands. Collected energy may support various maritime crafts, which may include unmanned underwater vehicles, gliders, sensors, and diver systems.

The wave energy collector 101 may be characterized as having survivability across a broad spectrum of climate conditions. The wave energy collector 101 may also facilitate marine life survivability-particularly supporting kelp reproduction. Kelp reproduction may be for the purpose of complementing local ecosystems, or instead supporting local kelp farming.

The wave energy collector 101 may also be characterized as low cost based on a variety of factors. Some factors may include ease of installation, use of COTS devices, and use of organic and regenerative material (i.e., kelp). With respect to installation, the anchoring element 103 and the mooring lines 113 may be simple and cost efficient designs, such as to reduce complexity and costs.

Figure 2:
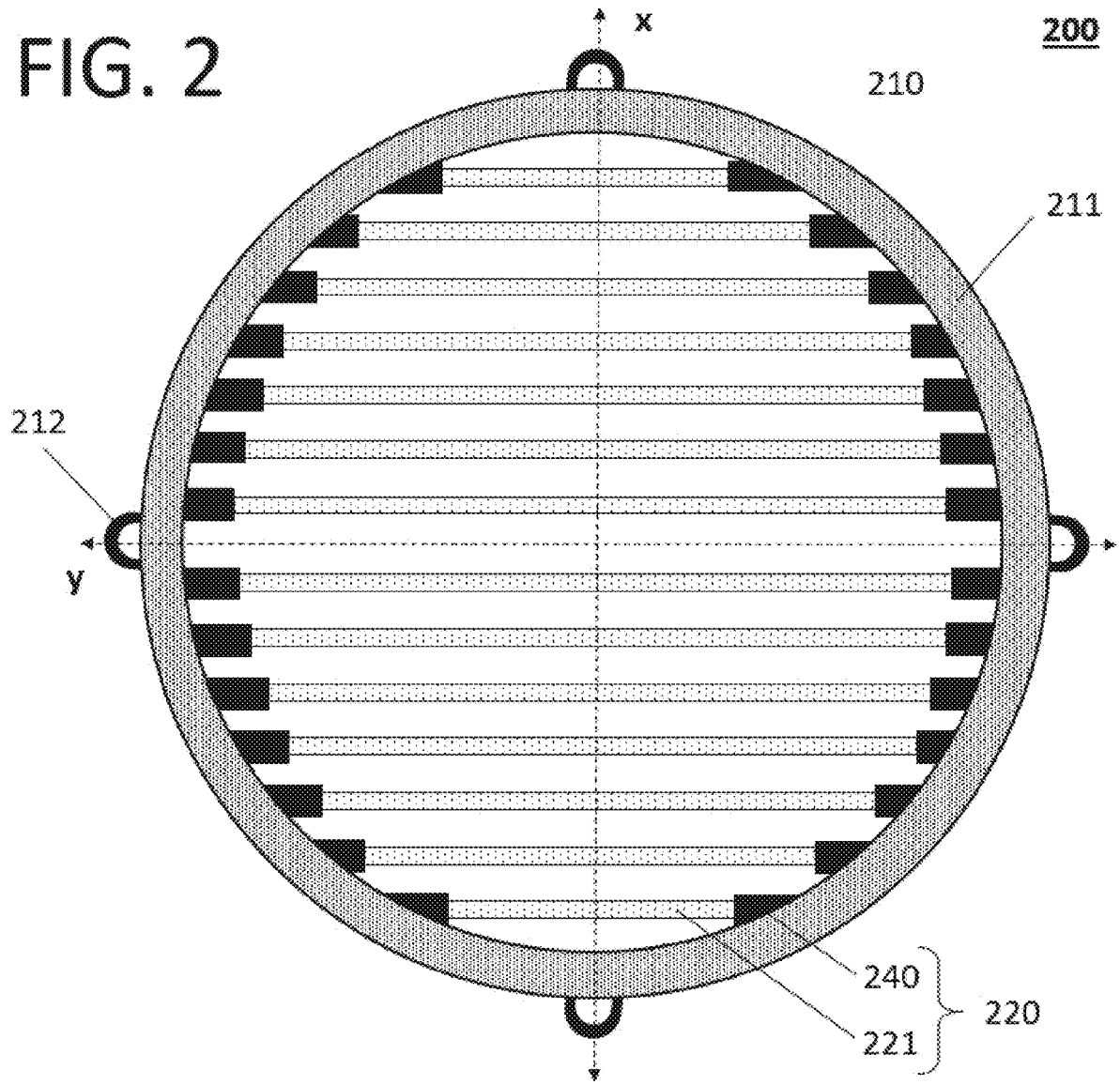
FIG. 2 is an illustration of a support structure of a kelp wave energy collector, according to example embodiments.

FIG. 2 is an illustration 200 of a support structure of a kelp wave energy collector, according to example embodiments. The support structure 210 may comprise a circular support 211. The circular support 211 may be in the shape of a ring. In alternative example embodiments, the circular support 211 may instead by in the shape of an ellipse, square, triangle, octagon, hexagon, and/or rectangle. The circular support 211 may be made up of a high-density polyethylene material. Such a constitution may facilitate buoyancy. The thickness of the circular support may be tuned to the physical size of the wave energy collector.

The circular support 211 may include a plurality of mooring line junctions 212. In the illustration 200, there are four mooring line junctions 212. In alternative example embodiments, there may be one, two, three, fix, six, seven, eight, nine, ten, twelve, or more mooring line junctions 212.

The number of mooring line junctions 212 may be commensurate with a number of buoyancy floater units in the wave energy collector.

Distributed throughout the support structure 210 may be a plurality of energy collection units 220. Each energy collection unit 220 may comprise a kelp farm line 221 and a PTO component 240. The kelp farm line 221 may be in the shape of a tube, extending across the circular support 211. The kelp farm lines 221 may be used for kelp reproduction. As previously stated, the energy collection units 220 operate under buoyancy-buoyancy self-referencing wave energy collection configuration. When kelp plants extend from the kelp farm lines 221, the kelp farm lines 221 act as biological kinetic energy collectors.

Each of the kelp farm lines 221 may house kelp growth pods. Kelp seeds may be planted within the kelp growth pods, distributed throughout the length of each kelp farm line 221. The pods may be polymer pods.

Over time, kelp may grow and fill the space between each farm line 221. The illustration 200 depicts the kelp farm lines 221 as bare (without any kelp) for the purposes of better depicting the configuration of each energy collection unit 220. Other illustrations hereinafter will depict the kelp farm lines 221 with planted kelp.

The distance between each kelp farm line 221 and the length of each kelp farm lines 221 may depend on a target deployment location. The linear pattern created by the plurality of kelp farm lines 221 may optimize available growth area and light. The linear pattern may also maximize the capture and transfer of energy from waves in a buoyancy-buoyancy self-referencing wave energy collection configuration. Each of the kelp farm lines 221 may be secured to the PTO components 240 and may be intended to be at different parts of a received ocean wave.

The PTO components 240 may be designed to be attached to each end of the kelp farm lines 221 within the entire circular support 211. Such a configuration may reduce the distance for energy transfer. This may result in increased energy transfer efficiency across the entire kelp wave energy collector.

The PTO components 240 may be smaller than conventional PTO components. Having smaller PTO components distributed across the entire circular support 211, it may be possible to track energy collection efficiency of different kelp farm lines 221 relative to wave conditions and kelp growth.

In some example embodiments, the length of the kelp farm lines 221 may correspond with anticipated length of propagating waves. In other example embodiments, the plurality of kelp farm lines 221 may have different lengths for the purpose of adjusting variable propagating wave lengths during long operation.

A single kelp farm line 221 may analogized with a traditional absorber device. For the purpose of modeling functionality of the kelp farm lines 221 and approximating available energy in a desired location, principles of Simple Wave Theory may be used. For example, energy may be determined as follows:

Total energy (E)=potential energy ($E_p$)+kinetic energy ($E_k$), (Equation 1)

$$E_k = E_p = \frac{1}{16}\rho g H^2 \lambda,$$ (Equation 2)

$$\bar{E} = \frac{E}{\lambda} = \frac{1}{8}\rho g H^2,$$ (Equation 3)

where,
g=the acceleration of gravity
ρ=the mass density of sea water
H=the vertical distance between crest and trough of the wave.

To assist the design of the PTO component 240, wave power may be approximated for a given location. For wave power, the incident wave power, $P_{inc}$, may be approximated using regular wave equations in a marine setting. It may be assumed that waves are unaffected by depth and/or may have little or no influence on the seabed. Wave period numbers may be used to determine other propagating wave parameters such as celerity and wavelength. Average power may be determined as follows:

$P_{inc} \cong H^2 T,$ (Equation 4)

where,
T=period of the wave.

The distance between each kelp farm line 221 and length of each kelp farm line 221 may depend on the target deployment location. The upper limit and optimized length for a linear absorber to capture heave motion is related to the wavelength λ of a propagating wave. According to existing line absorber systems theory, a theoretical capture length for a kelp farm line 221, based on hydrodynamic of wave energy conversion, may be determined to be limited by heave motion alone. This may have a capture width value, in an offshore setting, of λ/2 (where L=λ) or 3λ/4 (where L=2λ). Depending on deployment need, the length of a kelp farm line 221 may be a maximum 2λ. This parameter may also be the approximate maximum diameter of the circular support 211.

Recall that the blades of the kelp residing on the kelp farm line 221 may allow an energy collection unit 220 to act as a kinetic energy capturing mechanism. To fully characterize the energy collection unit 220 and to better understand the force transfer between the kelp farm line 221 and the PTO component 240, an approximate pull-force calculation may be insightful. For this purpose, a Morison equation may be used to approximate the theoretical force produced and ascertain a PTO component 240 configuration. The Morison equation is a semi-empirical equation in fluid dynamics for ascertaining an inline force on a body in oscillatory flow. The force may be characterized as follows:

$$F = \rho C_M V_a + \frac{1}{2}\rho C_D A u |u|,$$ (Equation 5)

where
F=Force,
$C_M$=inertia coefficient,
$C_D$=drag coefficient,
$V_a$=Volume of the structure, and
Au=Area of the cross-sectional perpendicular to the flow direction.

The variables described above may be determined experimentally in order to ascertain spacing of each of the plurality of energy collection units 220 in the circular support 211 of a wave energy collector. These characteristics may be dependent on the species of kelp selected. The characteristics may reflect endemic kelp, whether native species or a selectively farmed species. The total force of existing kelp populated farm lines may be measured using conventional models (e.g., OMEGA High Accuracy Digital Force Gauge model). The configuration of the circular support 211 of a wave energy collector may be determined based on the collected force data, as well as measured kelp growth density.

Figure 3:
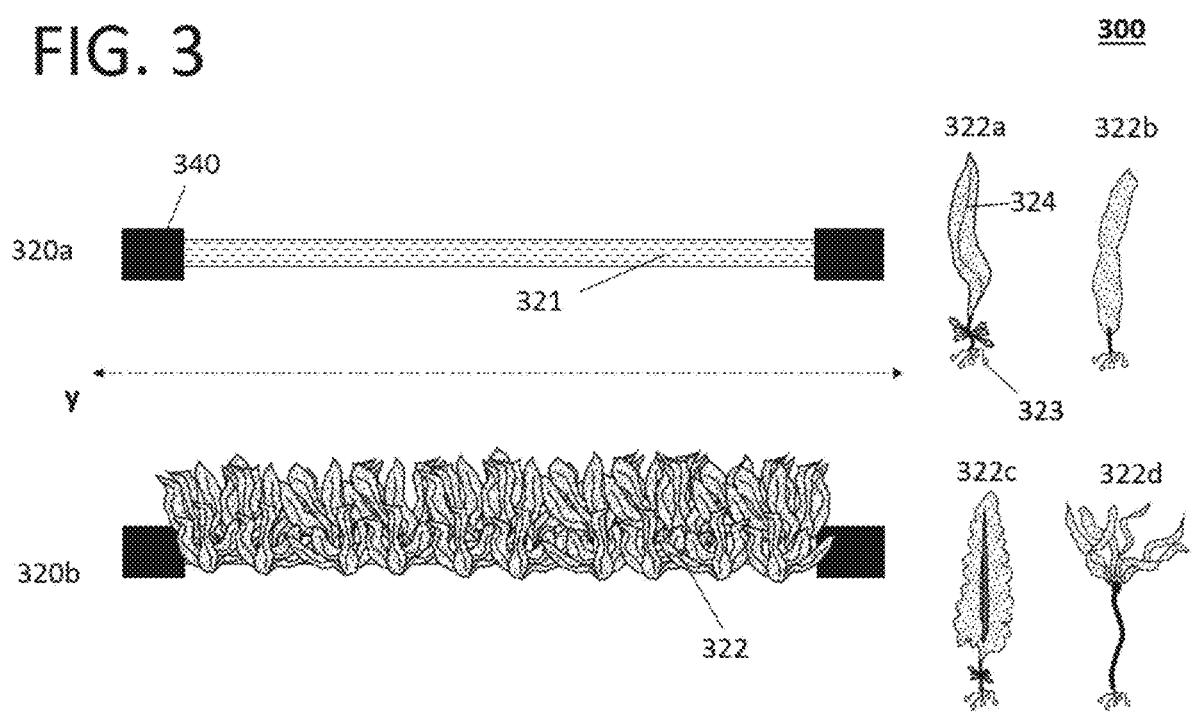
FIG. 3 is an illustration of an energy collection unit of a kelp wave energy collector, according to example embodiments.

FIG. 3 is an illustration 300 of an energy collection unit of a kelp wave energy collector, according to example embodiments. The illustration 300 juxtaposes a bare energy collection unit 320a with an energy collection unit with planted kelp 320b. The bare energy collection unit 320a depicts a power take off (PTO) component 340 at each end of a kelp farm line 321. The kelp farm line 321 is clearly visible in the bare energy collection unit 320a. In the energy collection unit with planted kelp 320b, the kelp farm line 321 is not visible due to kelp 322 growth across its length.

The kelp 322 may be any kelp/seaweed. Kelp is a form of macroalgae. Macroalgae are a category of plants widespread in coastal areas throughout the world. Macroalgae may be classified into three categories: green algae (Chlorophyta division); red algae (Rhodophyta division); and brown algae (Phaeophyta division).

Macroalgae may have various uses. More specifically, macroalgae may be used for waste water treatment, as $CO_2$ scrubbers (removal of industrial emission gases), in aquaculture, for generation of food, and as marine fauna habitat. There are environmental and capital opportunities for the generation of macroalgae in coastal settings. Various sea farm enterprises may undertake kelp farming in view of these uses. In addition, such enterprises may partner with local governments to improve local marine ecosystems. These farms may cultivate a variety of kelp that support a desired industry and/or ecosystem.

A wave energy collector, incorporating a plurality of energy collection units 320a/320b, may be self-sustainable, resistant to biofouling, able to operate in different ocean environmental conditions, and inexpensive to produce. Kelp farms provide an ideal conduit for use of the wave energy collector, according to example embodiments. The kelp 322 may have biological properties with a demonstrated ability to self-repair against biofouling and survive different marine conditions. The kelp 322 may also grow/proliferate at a fast rate-reaching maturity in months to support long term operation.

The kelp 322 may be harvested and used to produce food and/or biofuel for energy production. This additional use of the kelp 322 may take into account existing market uses, separate from energy generation. As such, an operator of the wave energy collector according to example embodiments may leverage the additional uses of the kelp 322 in order to offset any associated costs related to installation, operation, or maintenance of the wave energy collector.

Any type of kelp species may be used in the energy collection unit 320a/320b. Species selection may take into account the above discussed parameters for optimizing operation of the wave energy collector as a whole. An ideal kelp species for use in the energy collection units 320a/320 may be a species that has a quick growth rate, strong holdfasts 323, and large blades 324. Such traits may optimize kinetic energy capture by the energy collection units 320a/320b.

For example, a strong holdfast 323 (roots) may provide the kelp 322 the ability to hold onto the substrate of the kelp farm line 321. The strong holdfast 323 may also allow kinetic energy transfer from the kelp 322 connected to the kelp farm line 321. It should be noted that the kelp 322 may produce its own buoyancy through organically captured $CO_2$ floaters. The strong holdfast 323 may also serve its natural purpose of keeping the kelp 322 fixed to the kelp farm line 321.

The kelp 322 may also allow the wave energy collector to naturally adjust to maritime conditions. If environmental conditions result in higher wave power, beyond the strength of the holdfasts 323, then weaker kelp 322 may naturally release from the kelp farm line 321. This behavior may reduce the forces exerted on to the kelp farm line 321. This may offer natural self-correction for the wave energy collector, thereby protecting the same from infrequent extreme conditions.

With respect to the blades 324, their large size may directly increase the surface area contact with the waves. As a general rule of thumb, kinetic wave energy captured may increase with the greater blade contact surface area. A rapid maturation/growth rate of the kelp 322 may complement any benefits arising from large blades 324. An increased growth rates allows for self-regeneration of the kelp 322. This feature may allow for quicker regeneration of blades. Quick regeneration may guard against biofouling, extreme sea conditions, and other sources of biological damage. Also, a faster growth rate may facilitate a quicker full deployment of the wave energy collector.

Selection of a particular kelp 322 may also need to match the location of deployment of the wave energy collector. Through natural selection, each species of kelp has adopted to its specific climate region. Natural growth factors such as nutritional content, exposed solar intensity, and common sea wild life may impact growth rate and reproduction of the kelp 322. The wave energy collector may leverage the same factors that allowed a particular kelp to naturally succeed in a specific marine environment.

Species of kelp 322 with a known market may be used in example embodiments. A first example may be a winged kelp 322a (*Alaria esculenta*), common in the North Atlantic and in Europe. The winged kelp 322a may have a smaller, pointed blade. This kelp is known for having an olive taste. Another example may be the sugar kelp 322b (*Saccharina latissima*). The sugar kelp 322b may have long, opulent, amber blades that grow up to 16 feet long. This type of kelp is known for being very salty with savory umami flavors. The kombu kelp 322c (*Saccharina japonica*), also known as sweet kelp, is extensively cultivated in Asia. Kombu kelp 322c is commonly grown in ropes and easily amenable for incorporation into the kelp farm lines 321 of the wave energy collector. Kombu kelp is common in East Asian cuisine. Another example is bull kelp 322d (*Nereocystis luetkeana*). The bull kelp 322d has a single large stem that extends from the holdfast 323 to a canopy of blades. The bull kelp 322d may be pickled and eaten as a delicacy as well. A comparison of relevant characteristics these kelp species is provided in Table 1.

TABLE 1

Comparison of select kelp

| Species | Blades/ stems | Length (m) | Width (cm) | Area/ blade ($m^2$) | Common Location | Growth Rate (cm/day) |
| --- | --- | --- | --- | --- | --- | --- |
| Winged kelp 322a | 1 | 2 | 14 | 0.28 | North Atlantic (Europe) | 0.7 |
| Sugar kelp 322b | 1 | 5 | 20 | 1 | Mid Atlantic (US) | 4.9 |

TABLE 1-continued

Comparison of select kelp

| Species | Blades/ stems | Length (m) | Width (cm) | Area/ blade ($m^2$) | Common Location | Growth Rate (cm/day) |
|---|---|---|---|---|---|---|
| Kombu kelp 322c | 1 | 7 | 15 | 1.05 | Yellow Sea (Asia) | 30 |
| Bull kelp 322d | 30-64 | 4 | 15 | 0.6 | Pacific Coast (US) | 25 |

It should be noted that the four kelp depicted in the illustration 300 are not exhaustive of the types of the kelp 322 that may be used. The kelp 322 may be any type of green algae, red algae, and brown algae. Depending on the characteristics of the kelp 322, the PTO component 340 and the kelp farm line 321 may need to be adjusted accordingly.

Figure 4:
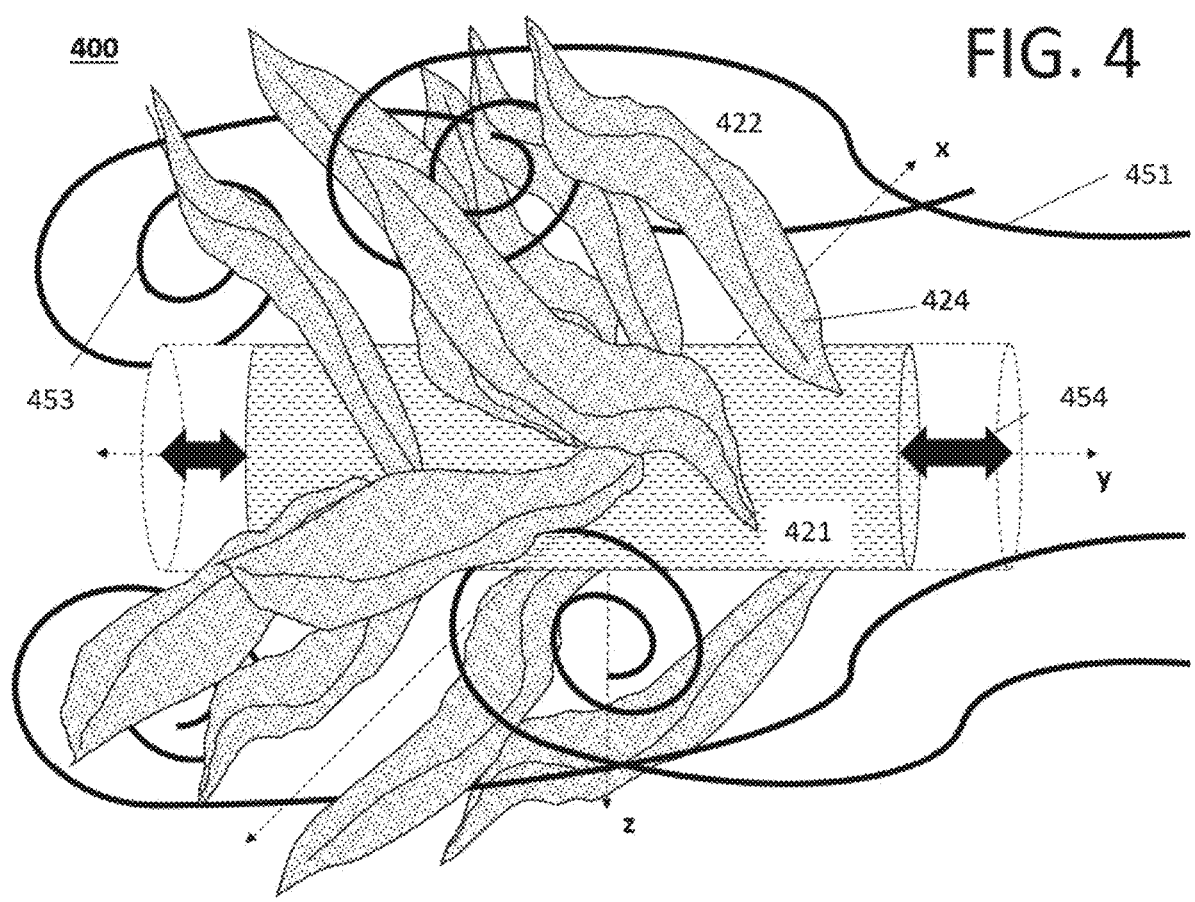
FIG. 4 is a detailed illustration of energy collection by a kelp farm line of a kelp wave energy collector, according to example embodiments.

FIG. 4 is a detailed illustration 400 of energy collection by a kelp farm line of a kelp wave energy collector, according to example embodiments. An objective of a wave energy collector according to example embodiments is to produce usable energy and serve as an operational platform for external systems, such as communications, GPS, UUVs, etc. The illustration 400 depicts a cross section of a kelp farm line 421 interacting with a kinetic force from an ocean wave 451.

The cross section of the kelp farm line has kelp 422. The ocean waves 451 provide kinetic energy that may be captured by the kelp 422. The ocean waves 451 may also generate a current vortex 453 after traversing the kelp 422. The kinetic energy generated by the current vortex 453 may also be captured by the blades of the kelp 422.

Power-Take-Off (PTO) is the primary power conversion mechanism for a wave energy collector according to example embodiments. The kinetic energy captured by the kelp 422 may then transfer the captured kinetic force of the ocean waves 451 and/or current vortex to the kelp farm line 421. This transfer may generate an oscillating linear force 454 on the kelp farm line 421. This linear force 454 may be captured by PTO components at each end of the kelp farm line 421. The linear force 454 may define the configuration and/or parameters of PTO components at the end of the kelp farm line 421. The PTO component may comprise a linear alternator, which may be used to convert back-and-forth linear force 454 into electrical energy.

Figure 5:
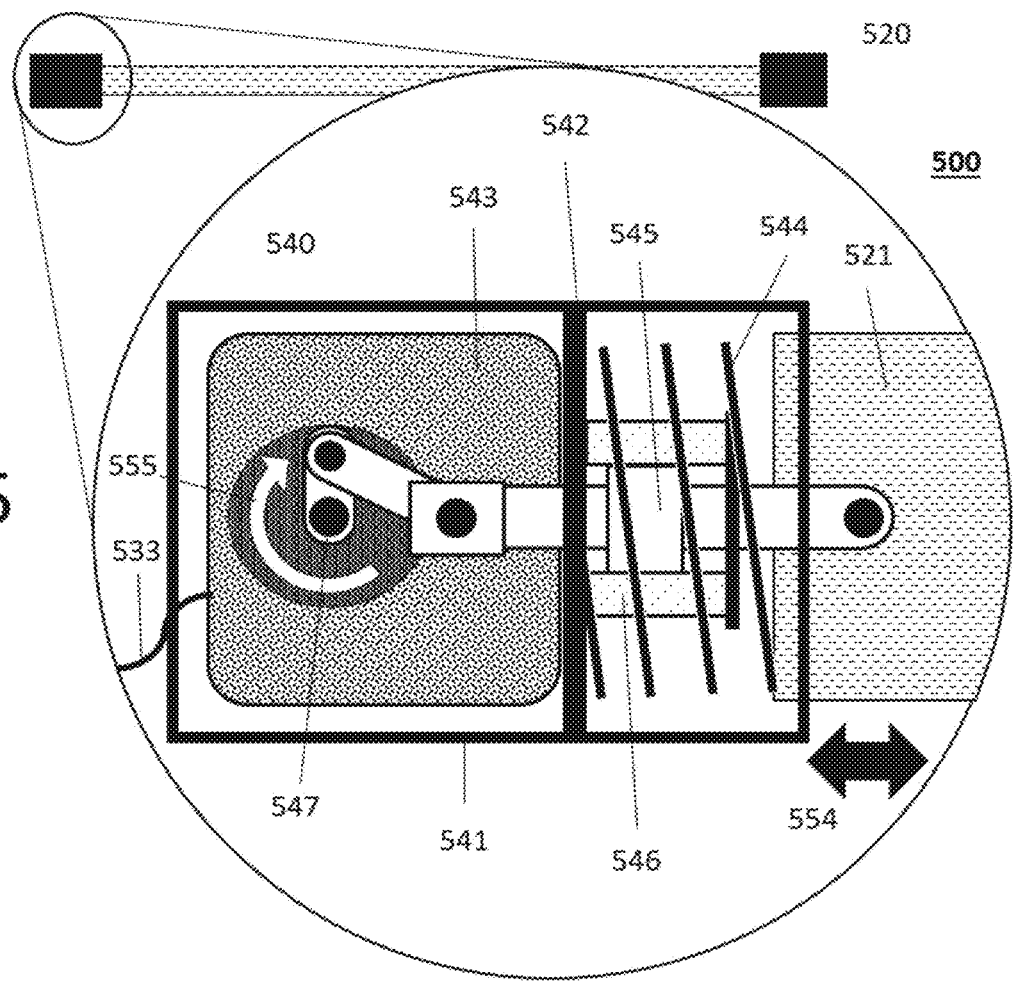
FIG. 5 is a detailed illustration of a power-take-off (PTO) component of a kelp wave energy collector, according to example embodiments.

FIG. 5 is a detailed illustration 500 of a power-take-off (PTO) component of a kelp wave energy collector, according to example embodiments. The illustration 500 focuses on one end of an energy collection unit 520, providing a cross-sectional view of an example PTO component design. The energy connection unit may comprise a kelp farm line 521 and a PTO component 540. The elements of the PTO component 540 may be housed in a PTO unit casing 541.

A linear actuator 542 may reside within the PTO unit casing. The linear actuator 542 may convert a captured linear force 554 to a rotational force 555 in order to generate electricity. The linear force may be initially generated by the kelp farm line 521, which captures kinetic energy via its constituent kelp blades. The linear actuator 542 may be a commercial off-the-shelf design, or a tailored design for us in a wave energy collector.

The PTO component 540 may further comprise various components to assist in the conversion of the linear force 554 to the rotational force 555. A bearing 545 and a bearing support 546 may push and pull an actuator stroke 547 in order to generate the rotational force 555. The bearing 545 and the bearing support 546 may also act as a guide for the entire kelp farm line 521. These elements may ensure that the kelp farm line 521 moves in only a single axis.

Ocean waves may exert both push forces and pull forces on the energy collection unit 520, which may exhibit itself as linear oscillations. A mechanical spring may improve capture of kinetic energy that is manifested as both push and pull. The PTO component 540 may include a mechanical spring 544 wrapped around the bearing 545. The spring 544 may improve the pull-versus-push forces dynamic that may be exerted by an ocean wave. The spring 544 may magnify the linear force 554 and increase rotational force conversion. As a result, the spring may increase functional performance of an energy collection unit 520. In addition, the actuator stroke 547 length may be tailored to the push/pull force in a marine environment. The actuator stroke 547 length may be 20-80 mm, 30-150 mm, and/or some combination thereof.

The PTO unit casing 541 may also include a waterproof divider 542 to seal water away. In the illustration 500, the waterproof divider 542 may protect the linear actuator 542 from water exposure. In alternative example embodiments, the waterproof divider 542 may reside at the base of the PTO component 540, thereby protecting all elements from water exposure.

As previously stated, the linear actuator may generate electricity based on the captured kinetic energy. The linear actuator 543 may then transmit the generated electricity to a separate location, such as a connected battery. The linear actuator 543 may provide the electricity via a power collection feed 533. The rechargeable battery receiving electricity via the power collection feed 533 may be housed within a support structure of a wave energy collector, or separate from the support structure.

Figure 6:
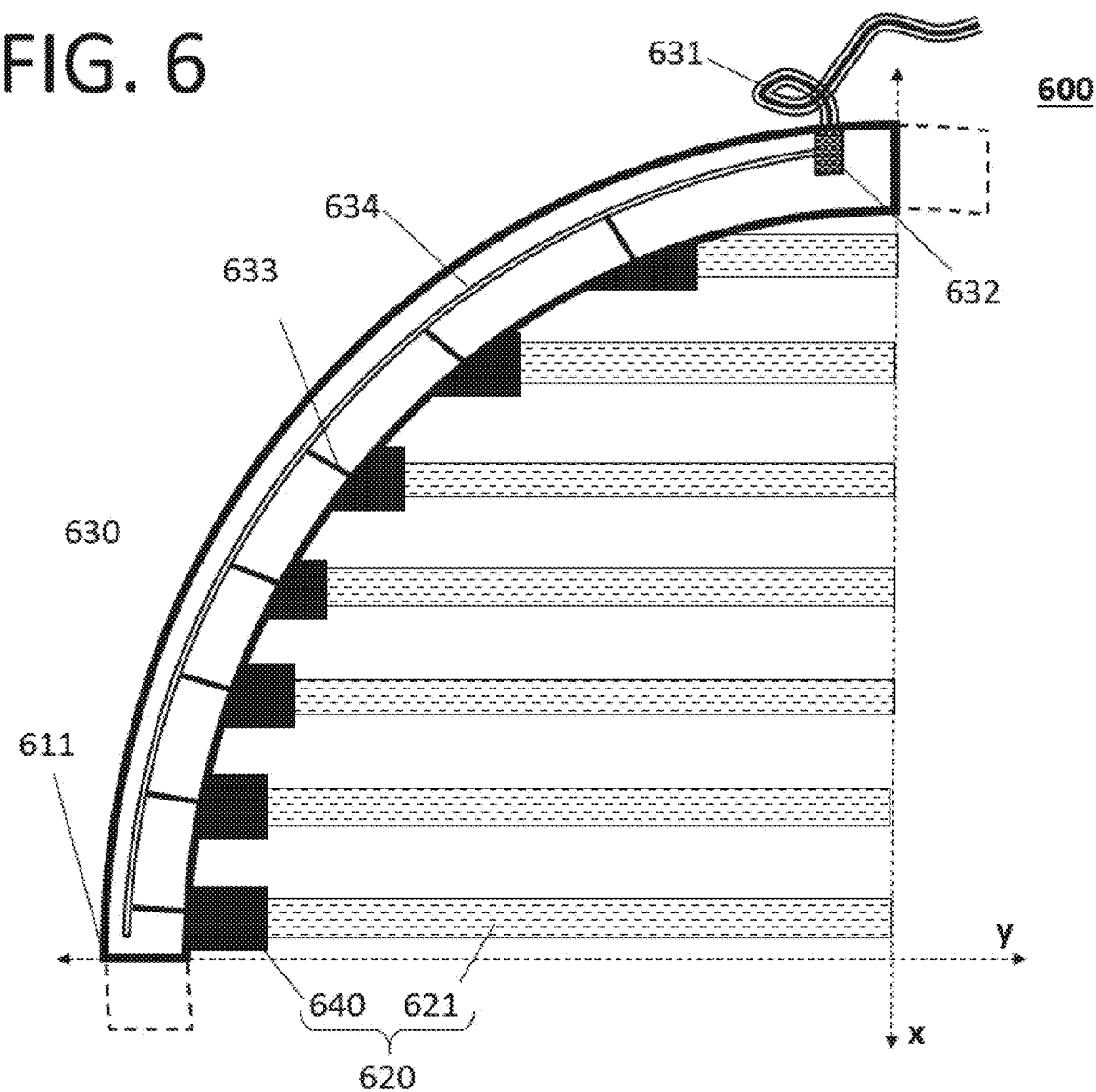
FIG. 6 is an illustration of a portion of an energy collection circuitry of a kelp wave energy collector, according to example embodiments.

FIG. 6 is an illustration 600 of a portion of an energy collection circuitry of a kelp wave energy collector, according to example embodiments. A quadrant of a circular support 611 is depicted in the illustration 600. In the illustration 600, energy collection circuitry 630 corresponding with the depicted quadrant is depicted.

Energy collection units 620 may be distributed within the circular support 611. Each energy collection unit 620 may include a PTO component 640 and a kelp farm line 621. Each PTO component 640 may include a corresponding power collection feed 633. When a PTO component generates electricity, it may feed the generated electricity via its dedicated the power collection feed 633.

All the power collection feeds 633 in a quadrant may connect with a single aggregation line 634. The aggregation line 634 may connect to a power line junction 632. The power line junction 632 may simply be a port to transmit collected electricity outside of the circular support 611. The collected electricity may be transmitted via power line 631. In alternative embodiments, the power line junction 632 may include a charging mechanism, for maintaining at least a portion of the generated power for the purpose of storage or self-operation. The power line junction may also be water sealed to prevent water from entering the circular support 611 and adversely impacting the energy collection circuitry 630.

The energy collection circuitry 634 may include additional components that are not illustrated. For example, each PTO component 640 may have (or, alternatively, be connected to) a host microcontroller for hybrid control, a host microcontroller for testing power, an integrated circuit, and a tandem battery and supercapacitor circuit with corresponding switching circuits. The PTO component 640 may also include a current sense board. The host microcontroller for hybrid control and the host microcontroller for testing power may each be an Arduino device. The integrated circuit may be an off-the-shelf chip (e.g., LTC4355).

FIG. 7A is a side view illustration 700a of a kelp wave energy collector, according to example embodiments. A wave energy collector 701a may comprise three principal components: a support structure 710; an energy storage unit 702; and an anchoring element 703. The entire wave energy collector 701a may be situated in a littoral environment, but in alternative embodiments may be used in deep and open ocean environments. This configuration may permit the intentional separation of the three elements in order to increase safety of the energy storage unit 702, while also providing potential cooling and compression benefits-particularly if used in non-littoral environments.

The support structure 710 may comprise a circular support 711 and a plurality of energy collection units 720. The energy storage unit 702 may be a rechargeable battery and/or a supercapacitor. The anchoring element 703 may be a weight, a traditional anchor, or an attachment that will keep the entire wave energy collector 701a in a fixed location in the ocean floor. These three elements are easily distinguished in the side view provided in the illustration 700b.

The principal components may be held together by structure mooring lines 713. The mooring lines 713 may be mooring chains. The combination of anchoring element 703 and mooring lines 713 may be as simple as possible to reduce deployment cost and material cost. The type and/or material of the mooring lines 713 may be dependent on the maritime conditions in the deployment location. Maximum drag of the wave energy collector 701a may be calculated to match the minimum tension requirements of the mooring lines 713. In some alternative example embodiments, the mooring lines 713 may be synthetic ropes, if the calculated tension requirements permit.

Buoyancy floater units 714 may provide buoyancy to the entire wave energy collector 701 in order to allow at least the support structure 710 to be suspended above the ocean floor. The buoyancy floater units 714 may be adjusted as needed to ensure appropriate buoyancy. There may be any number of buoyancy floater units 714 in the wave energy collector 701a. This example embodiment depicts four buoyancy floater units 714, one at each quadrant of the support structure 710. Each of the buoyancy floater units 714 may be connected to the support structure 710 by a support line 715. It should also be noted that the kelp plants in each energy collection unit 720 may also provide added buoyancy to the entire support structure 710.

The plurality of energy collection units 720 in the support structure 710 may capture kinetic energy generated by the ocean. The kinetic energy may come from ocean waves. In alternative example embodiments, the kinetic energy may be from deep water motion. The kinetic energy may be converted to electricity by PTO components at each of the plurality of energy collection units 720. This electricity may be transferred from the support structure 710 to the energy storage unit 702 via power lines 731.

The wave energy collector 701 may leverage the advantages of naturally regenerating kelp while delivering electrical energy harvested in an open ocean. The architecture of the wave energy collector 701 may minimize functional needs when compared to the state of the art of wave collectors. In particular, the wave energy collector 701 may exhibit low life cycle cost, mass fielding, and added electrical energy generation capability. The wave energy collector 701 may be tailored to the particular coastal area where it will be deployed, using endemic and/or locally harvested kelp as a basis for modular power generation.

Figure 7B:
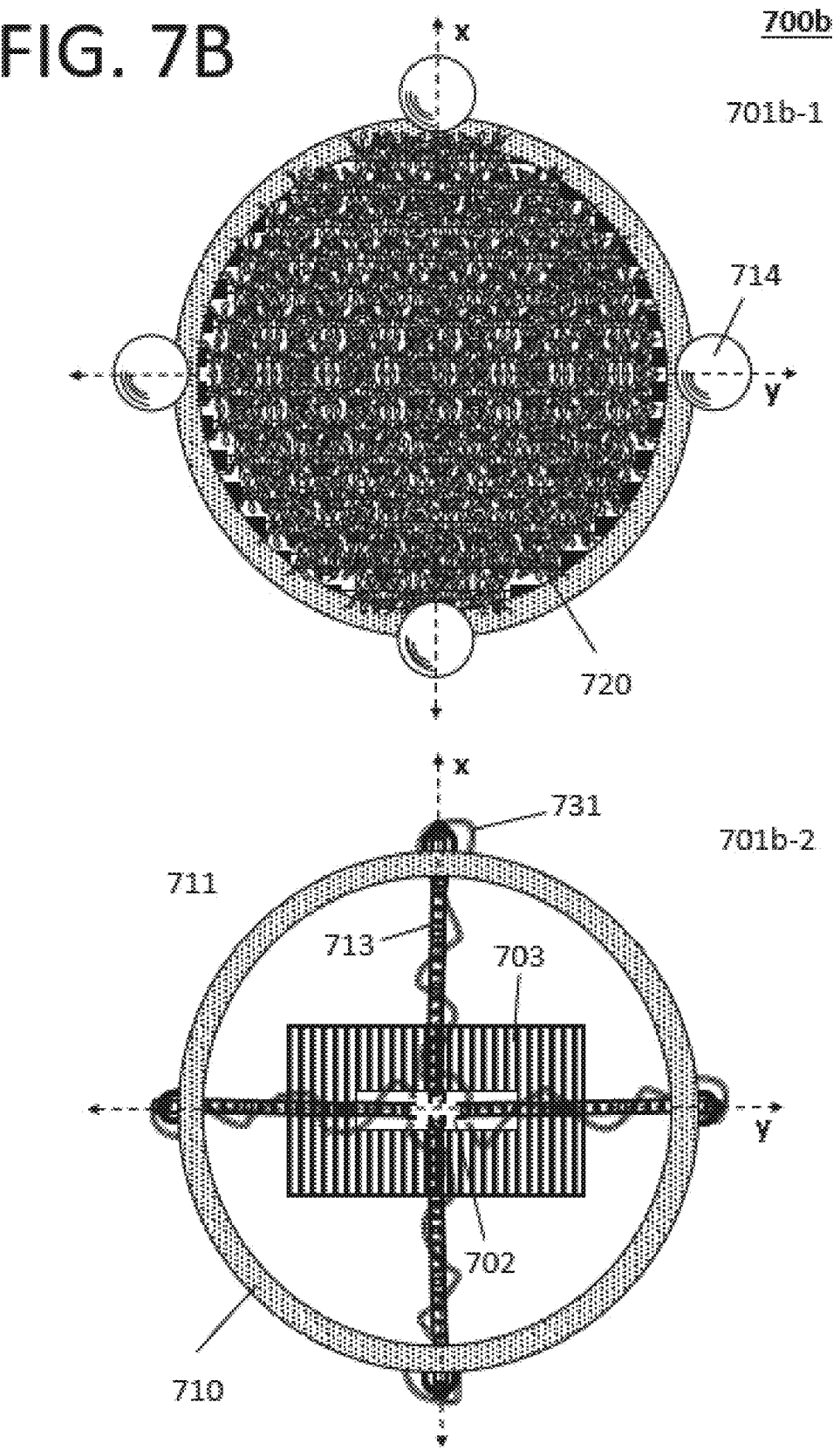
FIG. 7B is a top view illustration of a kelp wave energy collector with and without energy collection units, according to example embodiments.

FIG. 7B is a top view illustration 700b of a kelp wave energy collector with and without energy collection units, according to example embodiments. The illustration 700b juxtaposes two wave energy collector illustrations. A first wave energy collector 701b-1 includes a support structure 710, buoyancy floater units 714, energy collection units 720, and associated kelp plants. These elements illustrate a surface topology of the wave energy collector 701b-1 with grown kelp plants. However, this illustration also blocks the view of other components.

A second wave energy collector 701b-2 does not depict any energy collection units 720 or buoyancy floater units 714. The second is a wave energy collector 701b-2 is intended to depict the other constituent components of a wave energy collector according to example embodiments. These are the anchoring element 703 and the energy storage unit 702. The second wave energy collector 701b-2 also illustrates the location of these elements at a center location of a circular support 711 of the support structure 710.

The second wave energy collector 701b-2 also better depicts the additional parts of the support structure 710—namely the power lines 731 and the mooring lines 713. In alternative example embodiments, the power lines 731 and the mooring lines 713 may be the same. Some power lines 731 may be adequately heavy for needed tension requirements of the wave energy collector 701b-a, 701b-2.

In standard operation, the support structure 710 may be allowed to sink and rest at least 2 meters below the water surface. This distance from the surface may increase the survivability of the farm during extreme weather conditions in certain settings (e.g., North East Atlantic). Each of the energy collection units 720 may comprise a kelp farm line connected to a pair of PTO components. The kelp farm line of an energy collection unit 720 may be just below the surface of the circular support 711. Over the course of time, kelp growth may fill the circular support structure 711, as depicted in the first kelp wave energy collector 701b-1.

The kelp of the plurality of energy collection units 720 may capture kinetic energy from ocean waves and deep water motion. As the kelp picks up kinetic energy from the moving waves, they may transfer the energy to their attached kelp farm lines. This captured energy may then be converted to electricity by the PTO components and stored in the energy storage unit 702. The electricity may be transferred by the power lines 731. The energy storage unit 702 may be located relatively deeper in the marine environment in order to isolate any hazards associated with operation of the energy storage unit 702. This configuration may increase serviceability and reduce maintenance cost.

FIG. 8 is an illustration 800 of alternative embodiments of a support structure of a kelp wave energy collector, according to example embodiments. The design of a support structure may take into consideration functional feasibility, design simplicity, and pecuniary cost.

A first support structure 810a may comprise a circular support with a plurality of energy collection units. The first support structure 810a may minimize the distance between energy collection units. In this example embodiments, there are fourteen (14) energy collection units. The use of a circular support may result with the most efficient capture of kinetic energy from waves.

A second support structure 810b may have a similar circular support, but may include a lesser number of energy collection units. The second support structure 810b may maximize the distance between energy collection units. In this example embodiments, there are eight (8) energy collection units. Juxtaposing the first support structure 810a and the second support structure 810b, a number of energy collection units may be dependent at least on the characteristics of the marine environment, the kelp species used, the type of mechanical components (PTO components, kelp farm line).

The design of the support structure may also depart from the quadrant approach of the preceding two examples. However, such departures may result in lowered efficiencies. For example, a third support structure 810c may have the plurality of energy collection units in a slanted configuration. While a slanted design may offer prepositioned variable kelp farm line length without the complexity of added automation for line length adjustment, the slanted design may not be optimized to an incoming ocean wave.

Some designs may depart from a circular configuration. A fourth support structure 810d may use a square support instead of a circular support. Finally, a fifth support structure 810e may use a diamond support.

Figure 9:
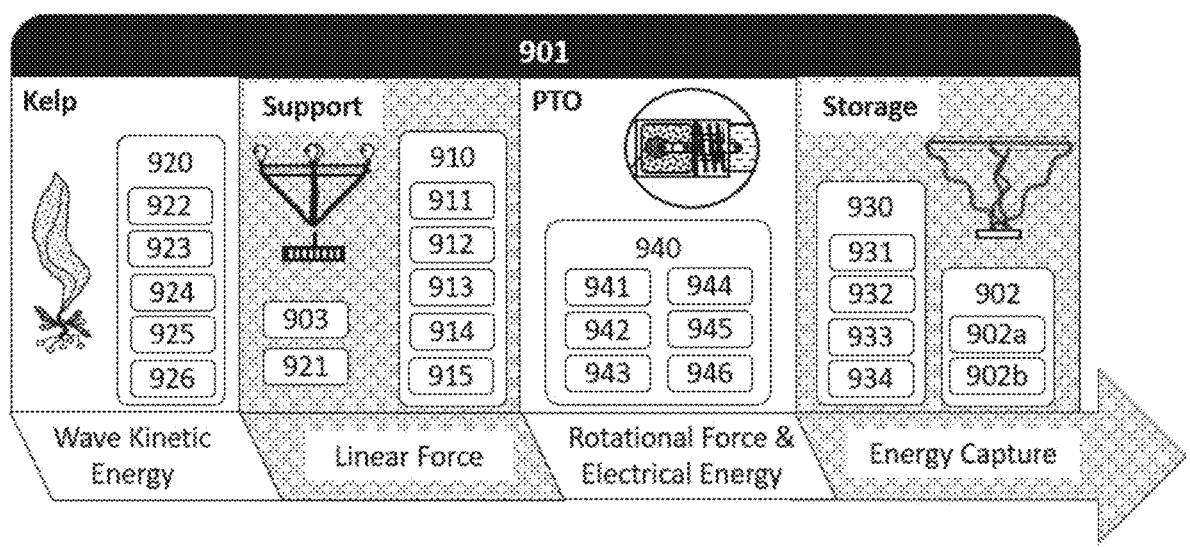
FIG. 9 is an illustration of a system model and a wave energy path of a kelp wave energy collector, according to example embodiments.

FIG. 9 is an illustration 900 of a system model and a wave energy path of a kelp wave energy collector, according to example embodiments. The wave energy collector 901 may have a high level objective to provide a long duration system that is cheap to deploy and maintain by an operator. The wave energy collector 901 may also provide the stored energy to external systems. The wave energy collector 901 aims to further expand available options in the renewable energy market.

A wave energy collector 901 may be divided into four subsystems for translating kinetic energy into stored electricity. The four subsystems may be: (1) a wave kinetic energy subsystem; (2) a linear force subsystem; (3) a rotational force & electrical energy subsystem; and (4) an energy capture subsystem. The wave kinetic energy subsystem may leverage biological solutions. The linear force subsystem may encompass an external framework and super structure of the full wave energy collector 901. The last two subsystems may focus on energy transfer, conversion, and storage. All these subsystems may share the characteristic of being durable over long durations, easy to deploy in location, and easily combinable to the overall structure of the wave energy collector 901.

The system model and wave energy path depicted in the illustration 900 portrays energy movement across the entire system. Associated energy transfer efficiency may be measured based on integration maturity. Each subsystem may meet various general and functional goals, as well as provide additional beneficial features. A brief discussion of each subsystem is provided below.

The wave kinetic energy subsystem focuses on the use of a kelp species to capture energy from ocean waves. This may include components of a plurality of energy collection units 920. Each of the plurality of energy collection units 920 may comprise kelp 922. The kelp 922 may include holdfast 923, at least one blade 924, a floater 925, and a stem 926. The kelp floater 925 is an organic material that may be filled with $CO_2$ and contribute buoyancy.

The wave kinetic energy subsystem may satisfy various functional requirements. The subsystem may be self-sustainable and support macroalgae growth. The wave kinetic energy subsystem may accomplish the primary goal of capturing kinetic energy from a propagating wave, as well as transferring the captures energy.

The wave kinetic energy subsystem may also have additional features that may be taken into consideration in determining use. For example, environmentally friendly features may include $CO_2$ capture and promotion of local marine ecosystems. In terms of business case features, the wave kinetic energy subsystem may result in secondary production of kelp byproduct for profit and/or use. Another business case feature is the possibility of cost-sharing with existing mass manufactured products across multiple industries.

The next subsystem is the linear force subsystem. This subsystem may focus on the mechanism of the wave energy collector 901 that is responsible for translating captured wave energy into a linear force. The main elements of this subsystem may be the support components, which may include an anchoring element 903, a kelp farm line 921, and a support structure 910. In particular, the support structure 910 may comprise a circular support 911, mooring line junctions 912 connected to mooring lines 913, and floater unit support lines 915 connected to buoyancy floater units 914. The linear force subsystem achieves various functional goals, such as transferring the captured wave energy into linear energy, as well as permitting buoyancy adjustments.

The rotational force & electrical energy subsystem may focus on converting the linear force into a rotational force in order to generate electricity. The main component of this subsystem may be a PTO component 940. The PTO component 940 may comprise a PTO unit casing 941, a waterproof divider 942, a linear actuator 943, a spring 944, a bearing 945, and a bearing support 946. The rotational force & electrical energy subsystem complements the preceding subsystems in transferring the captured kinetic energy from ocean waves to rotational force, which generates electricity.

Finally, the energy capture subsystem may focus on storing the generated electricity. The two main components of this subsystem may be the energy collection circuitry 930 and the energy storage unit 902. The energy collection circuitry 930 may comprise power lines 931, power line junctions 932, power collection feeds 933, and power aggregation lines. The energy collection circuitry 930 may also comprise a host microcontroller for hybrid control, a host microcontroller for testing power, an integrated circuit, and a switching circuit.

The energy capture subsystem should meet general requirements of safety, survivability, durability, and inexpensive manufacturability. In this respect, the energy storage unit 902 may be configured to be hybridized for power and energy storage. The constituent parts may need to be high power capable and high energy dense.

In one example embodiment, the energy storage unit 902 may comprise a battery 902a, a supercapacitor 902b, or a combination thereof. If the energy storage unit 902 comprises such a combination, the energy collection circuitry 930 may also include circuitry for switching between the two energy sources. Such a hybrid system may manage sending power to one load from one power source. More particularly, the battery 902a may handle baseline and steady-state loads while output from the supercapacitor 902b remains off. When a sharp increase in load demand occurs, the output of the battery 902a may be switched off and output from the supercapacitor 902b may powers an entire load. Only when a load demand returns to steady-state may the hybrid system switch back from the supercapacitor 902a to the battery 902a. In this manner, the energy capture subsystem allows for the storage of electricity for future use.

Generally, the energy capture subsystem is intended as an essential source of power for external systems, such as communication devices (e.g., GPS), unmanned surface and underwater vehicles, and/or a recharging bay. However, in some alternative example embodiments, the entire energy capture subsystem may be omitted during use in proximity to a shoreline. Output from the rotational force & electrical energy subsystem may be hard wired to electrical infrastructure on the shore.

The example embodiments being thus described, it will be obvious that the same may be varied in many ways. Such variations are not to be regarded as a departure from the disclosed subject matter, and all such modifications are intended to be included within the scope of the disclosed subject matter.

As used herein, "a number of" when used with reference to items, means one or more items. For example, "a number of different types of farm lines" is one or more different types of farm lines.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Any combinations of these items can be present. In some illustrative examples, "at least one of" can be, for example, without limitation, two of item A; one of item B; and ten of item C; four of item B and seven of item C; or other suitable combinations.

What is claimed is:

1. A wave energy collector apparatus comprising:
   a plurality of energy collection units configured to capture kinetic energy from water movement through use of organic material grown on the plurality of the energy collection units, the organic material having regenerative units with a surface area that are able to receive the kinetic energy;
   a support structure configured to have buoyancy and float above a floor of a body of water, the support structure comprising a shaped support and the plurality of energy collection units, wherein the plurality of energy collection units are distributed throughout the shaped support;
   an anchoring element connected to the support structure and configured to keep the wave energy collector apparatus at least substantially fixed to a location on the floor of the body of water,
   wherein the plurality of energy collection units are configured to convert the captured kinetic energy into electricity,
   wherein each of the plurality of energy collection units comprises a farm line and a power conversion unit at each end of the farm line, such each of the energy collection units are configured to have the regenerative units with surface area transfer the captured kinetic energy to the farm lines in the form of a linear force, wherein the power conversion unit is configured to convert the linear force into the electricity.

2. The wave energy collector apparatus of claim 1, wherein the farm line comprises growth pods distributed throughout a length of the farm line, such that farm lines are configured to grow the organic material and have the organic material extend out of the farm line in order to have the units with the surface area extend into the water.

3. The wave energy collector apparatus of claim 2, wherein the organic material having regenerative units with the surface area are kelp plants having regenerated blades with a surface area, such that the farm lines are kelp farm lines.

4. The wave energy collector apparatus of claim 3, wherein each of the kelp farm lines are configured to comprise a plurality of kelp plants grown on the growth pods, wherein holdfast of each kelp plant are attached to a kelp farm line and a blade of each kelp plant extends into the water, such that the blades of the kelp plant are configured to receive the kinetic energy from the water movement.

5. The wave energy collector apparatus of claim 4, wherein the kelp plant is one of winged kelp, sugar kelp, kombu kelp, and bull kelp.

6. The wave energy collector apparatus of claim 1, wherein the power conversion unit is a power take off (PTO) component, such that the PTO component is configured to be at each end of the farm line, wherein each PTO component comprises a linear actuator and is configured to convert the linear force into a rotational force, wherein the linear actuator is configured to convert the rotational force into the electricity, such that the PTO components is configured to transfer the electricity to energy collection circuitry.

7. The wave energy collector apparatus of claim 6, wherein the PTO component further comprises a casing that is configured to be water proof, a mechanical spring configured to improve push and pull forces of the linear force, a bearing and bearing support configured to have the farm line move in a single axis.

8. The wave energy collector apparatus of claim 6, wherein the electricity from each of the PTO components in the plurality of energy collection units are configured to be received by energy collection circuitry, the energy collection circuitry comprising
   a power collection feed at each PTO component,
   at least one aggregation line configured to receive the electricity from a plurality of power collection feeds, a portion of the plurality of power collection feeds being dedicated to one of the at least one aggregation line,
   a power line junction configured to receive the electricity from the at least one aggregation line, the power line junction configured to provide the electricity outside of the support structure.

9. The wave energy collector apparatus of claim 1, further comprising:
   an energy storage unit configured to receive and store the electricity from the plurality of energy collection units;
   mooring lines configured to be connected to the support structure, the energy storage unit, and the anchoring element, wherein the mooring lines are configured to allow the anchoring element to keep the support structure and the energy storage at least substantially fixed to the location on the floor of the body of water.

10. The wave energy collector apparatus of claim 9, wherein the energy storage unit is configured to receive the electricity from power lines connected to the support structure and configured to receive the electricity from the plurality of energy collection units.

11. The wave energy collector apparatus of claim 9, wherein the energy storage apparatus is a hybridized power and energy storage unit comprising a battery and a supercapacitor.

12. The wave energy collector apparatus of claim 1, further comprising:
   a plurality of buoyancy floater units configured to be connected to the support structure via support lines, the plurality of buoyancy floater units configured to provide buoyancy to the support structure such that the support structure floats above the floor of the body of water.

13. An energy collection unit apparatus comprising:
a farm line configured to capture kinetic energy from water movement through use of organic material grown on the farm line, the organic material having regenerative units with a surface area that are able to receive the kinetic energy and transfer the captured kinetic energy to the farm lines in the form of a linear force;
a pair of power conversion units at each end of the farm line and configured to convert the linear force into electricity for storage at an external energy storage unit.

14. The energy collection unit apparatus of claim 13, wherein the farm line comprises growth pods distributed throughout a length of the farm line, such that farm lines are configured to grow the organic material and have the organic material extend out of the farm line in order to have the units with the surface area extend into the water.

15. The energy collection unit apparatus of claim 14, wherein the organic material having regenerative units with the surface area are kelp plants having regenerated blades with a surface area, such that the farm lines are kelp farm lines.

16. The energy collection unit apparatus of claim 14, wherein each of the kelp farm lines are configured to comprise a plurality of kelp plants grown on the growth pods, wherein holdfast of each kelp plant are attached to a kelp farm line and a blade of each kelp plant extends into the water, such that the blades of the kelp plant are configured to receive the kinetic energy from the water movement.

17. The energy collection unit apparatus of claim 13, wherein each of the pair of power conversion units is a power take off (PTO) component, such that the PTO component is configured to be at each end of the farm line, wherein each PTO component comprises a linear actuator and is configured to convert the linear force into a rotational force, wherein the linear actuator is configured to convert the rotational force into the electricity, such that the PTO components is configured to transfer the electricity to the external energy storage unit through energy collection circuitry.

18. A wave energy collector system comprising:
a wave kinetic energy subsystem configured to collect kinetic energy with organic material, the kinetic energy subsystem comprising a plurality of energy collection units configured to capture the kinetic energy from water movement through use of organic material grown on the plurality of the energy collection units, the organic material having regenerative units with a surface area that are able to receive the kinetic energy;
a linear force subsystem configured to translate the captured kinetic force into linear force, the linear force subsystem comprising at least a support structure configured to have buoyancy and float above a floor of a body of water, the support structure comprising a shaped support, wherein the plurality of energy collection units are distributed throughout the shaped support and comprise farm lines, wherein the regenerative units with surface area transfer the captured kinetic energy to the farm lines in the form of a linear force;
a rotational force and electrical energy subsystem configured to convert the linear force into a rotational force and generate electricity, the rotational force and electrical energy subsystem comprising power conversion units located at each end of each of the farm lines, wherein each power conversion unit comprises a linear actuator and is configured to convert the linear force into a rotational force, wherein the linear actuator is configured to convert the rotational force into the electricity, such that the power conversion unit is configured to transfer the electricity; and
an energy capture subsystem configured to store the electricity, the energy capture subsystem comprising energy collection circuitry and an energy storage unit, wherein the energy collection circuitry is configured to transfer the electricity to the energy storage unit.

19. The wave energy collector system of claim 18, wherein the a linear force subsystem further comprises an anchoring element connected to the support structure and configured to keep the wave energy collector apparatus at least substantially fixed to a location on the floor of the body of water, and wherein the power conversion units in the rotational force and electrical energy subsystem are power take off (PTO) components.

* * * * *